United States Patent [19]

Stouffer et al.

[11] Patent Number: 4,686,890
[45] Date of Patent: Aug. 18, 1987

[54] AIR DISTRIBUTION SYSTEM

[75] Inventors: Ronald D. Stouffer, Silver Spring; Paul L. Sulsky, Columbia, both of Md.

[73] Assignee: Bowles Fluidics Corporation, Columbia, Md.

[21] Appl. No.: 650,468

[22] Filed: Sep. 14, 1984

[51] Int. Cl.[4] .................. B60H 1/34; F24F 13/08
[52] U.S. Cl. ................................ 98/2; 98/40.01; 98/40.18; 137/872; 239/447; 239/449
[58] Field of Search .............. 98/2, 40.01, 40.12, 98/40.13, 40.16, 40.17, 40.18, 40.22, 40.24, 40.3, 41.3; 137/872, 873, 874, 875, 876; 239/446, 447, 448, 449

[56] References Cited

U.S. PATENT DOCUMENTS

| | | | |
|---|---|---|---|
| 2,812,980 | 11/1957 | Kadosch et al. | |
| 3,122,087 | 2/1964 | Demuth et al. | 98/40.12 |
| 3,254,587 | 6/1966 | Sweeney | 98/40.12 |
| 3,745,906 | 7/1973 | Kakei et al. | 98/2.09 |
| 3,811,369 | 5/1974 | Ruegg | 98/40.17 |
| 4,407,186 | 10/1983 | Izumi et al. | 98/2 |

FOREIGN PATENT DOCUMENTS

| | | | |
|---|---|---|---|
| 61532 | 5/1981 | Japan | 98/40.18 |
| 57-105639 | 7/1982 | Japan | 98/40.01 |
| 222343 | 10/1924 | United Kingdom | 98/40.24 |
| 1162605 | 8/1969 | United Kingdom | 98/41.1 |

Primary Examiner—Harold Joyce
Attorney, Agent, or Firm—Jim Zegeer

[57] ABSTRACT

An air distribution system, particularly for automobiles, in which the depth of the unit is relatively short and in which control over the direction of air flow can be achieved by movement of an element in a plane orthogonal to the direction of air flow. A main air flow outlet is formed in a wall member and a parallel flow path is formed adjacent the outlet and has diverging walls which are relatively short so that there is no wall attachment or coanda effects per se. Flow of fluid through the adjacent parallel flow path exits through an opening that directs the air in a direction generally parallel to the short wall direction of the adjacent flow path. By controlling the entry of air into the parallel flow path, the main air flow vector is deflected and the direction of flow is thereby controlled. The deflection is greater when an obstacle slightly intrudes the side of the outlet opposite the parallel flow path. With a rectangular outlet opening, four adjacent parallel paths with short, straight or curved walls and adjacent parallel passages and obstacle intruders, the flow can be controlled in four directions or can be caused to diffuse generally in a forward direction. The element for control is basically a plate element movable in the plane transverse to the direction of the main air flow so that relatively short depth is required for installation of the device in an automobile system. By adding a control flap, the angular sweep can be greatly enlarged.

14 Claims, 20 Drawing Figures

FIG.1
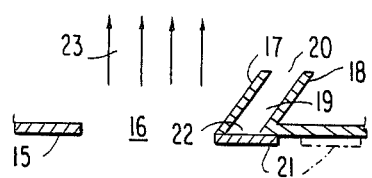
FIG.2
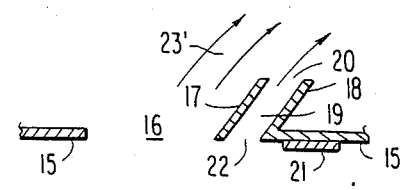
FIG.3
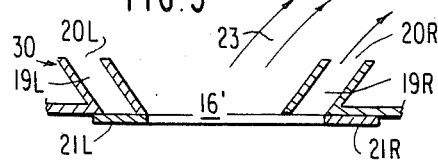
FIG.4
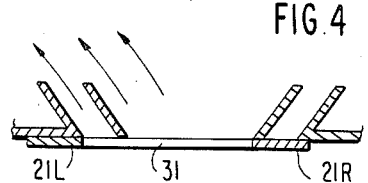
FIG.5
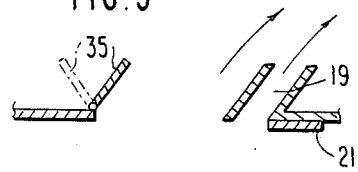
FIG.9
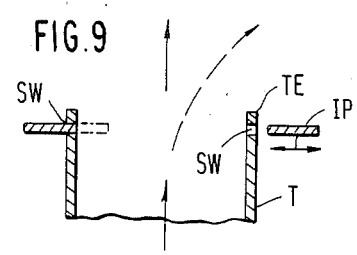
FIG.6
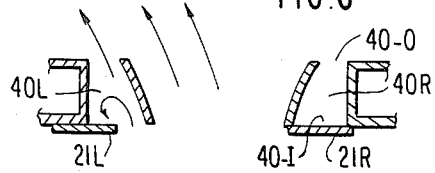
FIG.7
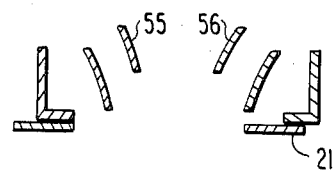
FIG.8
FIG.10a PRIOR ART
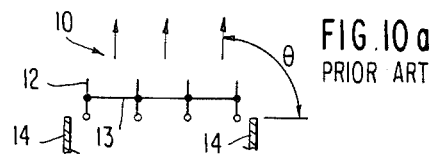
FIG.10b PRIOR ART
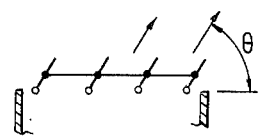
FIG.10c PRIOR ART
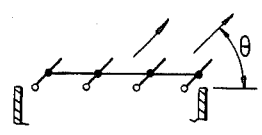
FIG.10d PRIOR ART
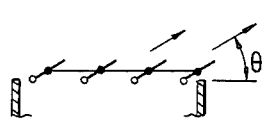

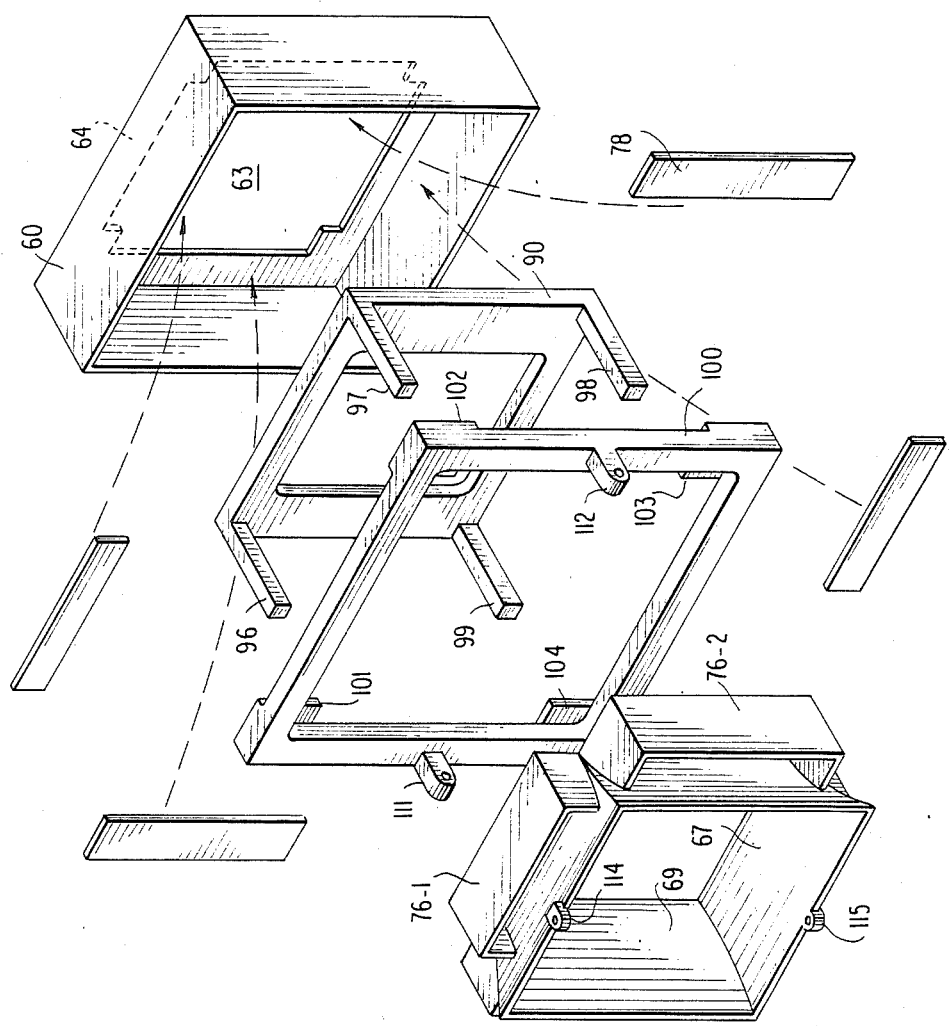

AIR DISTRIBUTION SYSTEM

BACKGROUND AND BRIEF DESCRIPTION OF THE INVENTION

Louvers mounted in rotatable barrel mounts and the like are the most common form of air control outlets utilized in automobiles (and also in homes and the like). There are certain well known limitations in the use of louvers in that they form an impedance causing a loss in air flow which increases as the louverse are turned transverse to the direction of flow. Moreover, when a louver is at an extreme right or left position in an automobile, as on the passenger side and adjacent the door, luvers can not be utilized to effectively direct air from that particular outlet towards the driver side when desired. As shown in FIG. 10, a conventional multi-louver element is commonly controlled by a lever (not shown) so that all of the louver elements are commonly moved by the linkage system. As the louvers are gradually moved in a direction to direct more flow of the air, the louvers also shut down the flow of air. Even when the louver is in a barrel mount and rotated on its axis, the rotation of the element in its barrel mount in effect begins to shut down air as the portions of the barrel mounting structure intercede into the flow path.

U.S. Pat. No. 2,812,980 and Canadian Pat. No. 493,723 disclose jet deflecting devices and processes in which an obstacle intrudes into the main flow path in association with a downstream rounded shaping of a bounding wall surface to enhance the deflection. A hybrid solenoid driven fluidic element and louvers is disclosed in Izumi et al. U.S. Pat. No. 4,407,186 and in Kakei U.S. Pat. No. 3,745,906 various fluidic and electromechanical deflection devices are used to oscillate defrost air in automobiles.

The basic object of the present invention is to provide an improved air distribution system, particularly for use in automobiles. A further object of the invention is to provide an improved air distribution system which has less impedance and hence is more efficient in distribution of air, and a control system in which the control does not add any significant impedance to the air flow and hence is more efficient. A further object of the invention is to provide relatively low impedance air flow distribution control system which is relatively shallow or short in design so that it does not protrude into the air flow channel or into the space of an automobile, for example. And in which the air flow can be deflected in four directions or left undeflected.

In accordance with the invention, an air outlet is formed in a duct, for example. In a preferred embodiment, a short diverging wall is formed adjacent the air flow outlet and a second wall forms an air flow passage which is parallel to the main flow and for purposes of description has an upstream end which is coupled to the air flow from the duct and a downstream end which directs air in a direction substantially parallel to the short diverging wall. The term "short" is intended to mean a wall which, in relation to the air flow, has no significant coanda effects. By controlling the inlet end of the air flow passage to block or unblock same, the main air flow stream through the outlet is controlled so as to move towards and away from the short parallel wall. The short parallel wall is of insufficient length for wall attachment purposes. While the short wall is preferrably curved, it can obviously be straight. The outlet, which preferably is rectangular or square, provides five control directions, up, down, left, right, and straight ahead or any combination of adjacent directions. By a flap element or one movable short wall, it can be moved into the air stream so as to enhance the sweep angle. Alternatively, fixed louvers can be added parallel to the short walls so as to cause a greater sweep angle.

In a further aspect of the invention, the control element can be an intruder plate which intrudes a relatively short distance into an outlet at the terminus of a duct.

The above and other objects, advantages and features of the invention will become more apparent from the following specification when considered with the accompanying drawings wherein:

FIG. 1 is a diagrammatic illustration of the basic control principle utilized in this invention.

FIG. 2 is a diagrammatic illustration of the control element shown in FIG. 1 illustrating the control effect achieved by unblocking the parallel flow path.

FIG. 3 is a diagrammatic illustration of a pair of the control elements shown in FIG. 1, FIG. 4 is similar to FIG. 3 illustrating the opposite control effect.

Figure 11:
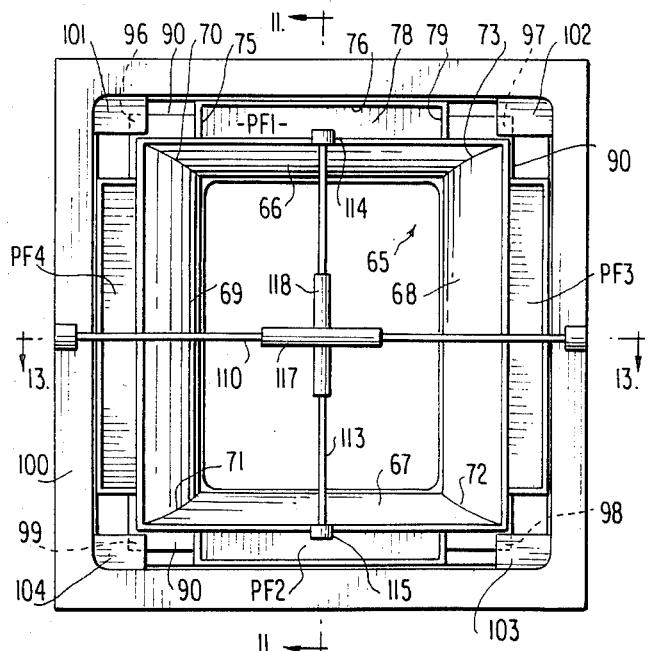
Figure 12:
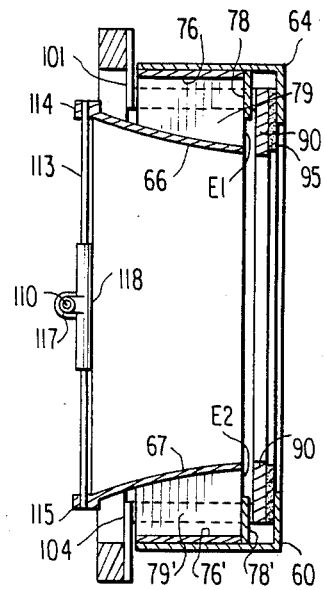
Figure 13:
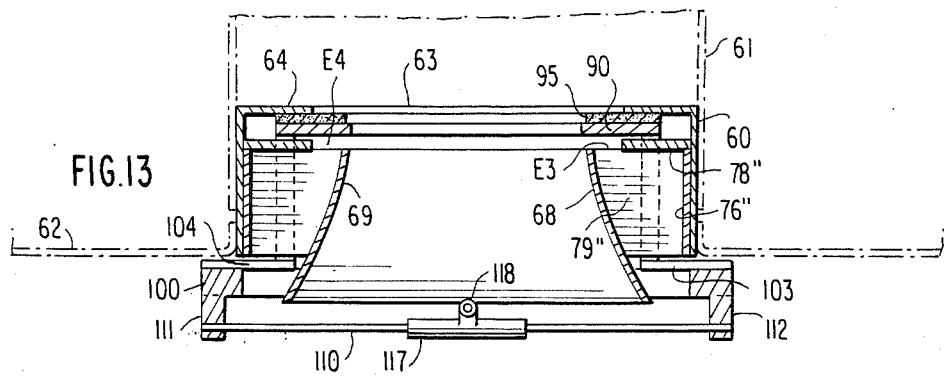
Figure 14:
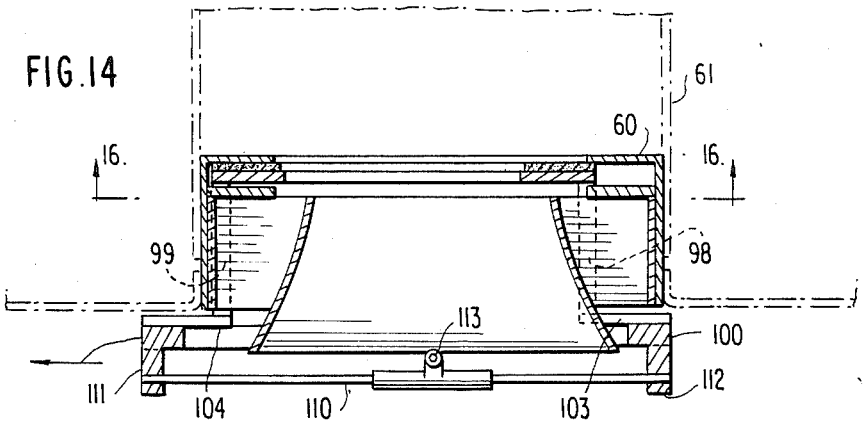

FIG. 5 is a modification of the embodiment shown in FIG. 1 in which a control flap has been added to provide a greater angle of air deflection, FIG. 6 is a further diagrammatic view illustrating the configuration of the side or parallel fow passage, FIG. 7 illustrates a further embodiment of the invention, somewhat similar to FIG. 5 with a control flap, FIG. 8 illustrates a further embodiment of the invention with fixed vanes, FIG. 9 illustrates a further aspect of the invention in which an intruder plate at the terminus of a duct is used to provide controlled stream deflection, FIG. 10a, 10b, 10c and 10d are a diagrammatic illustration of the prior art adjustable louver arrangement, FIG. 11 is a front view of an air distribution assembly incorporating the invention, FIG. 12 is a sectional view taken on lines 11—11 of FIG. 11, FIG. 13 is a sectional view taken on lines 13—13 of FIG. 11, FIG. 14 is a sectional view similar to FIG. 13 but showing the control being shifted to the left so that air distribution is directed to the left.

Figure 15:
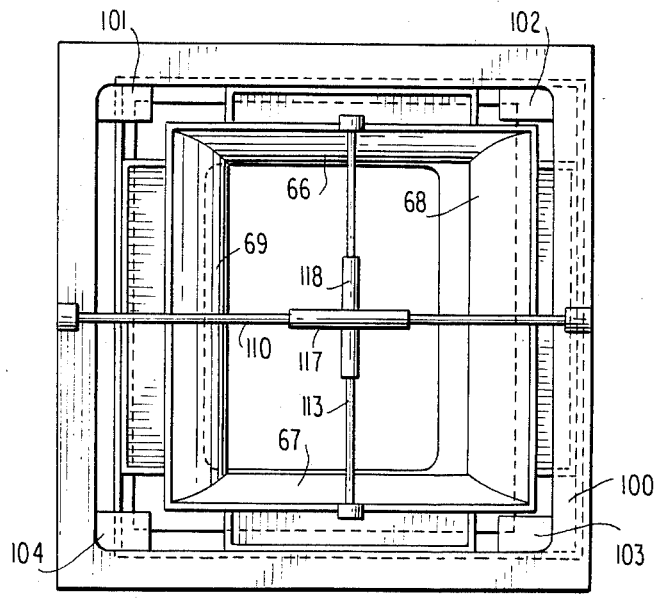
Figure 16:
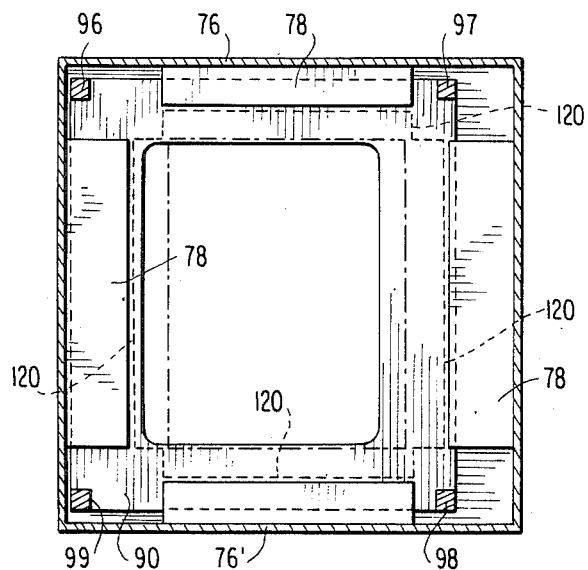

FIG. 15 is a front view showing the control element of FIG. 14 in its shifted position, FIG. 16 is a sectial view in the direction of arrows 16—16 of FIG. 14 and FIG. 17 is an exploded view of the assembly.

DETAILED DESCRIPTION OF THE INVENTION:

Referring to FIG. 10, a conventional louver assembly 10 is shown composed of individual louver slats or elements 12 pivotally connected to a common control member 13 and connected to an air supply duct 14. The louver elements 12 are all pivotally mounted in assembly and controlled by control linkage 13 so that they are all maintained parallel to one another and adjustable angularly in relation to the direction of air flow from duct 14. In the position shown in FIG. 10a, the louvers do not direct the flow of air in one direction or the other and present the least impedance to air flow. As the louvers are gradually turned so as to direct more of the air flow to the right, for example, it will be noted that the passage between the louvers gradually narrow to the condition shown in FIG. 10d where the air flow is substantialy blocked. While the gradual closing down of the air flow passage causes a slight acceleration in the air flow, the impedance or loss in air pressure are greatly increased. Even when the louvers are mounted in a rotatable barrel mount, the barrel mount itself tends to introduce an impedance or resistance to air flow thereby reducing the efficiency of the unit.

In accordance with the present invention, a short diverging wall is formed adjacent the air outlet, and a second wall defines a parallel flow path and by controlling the upstream end of the parallel flow path, the direction of air flow through the main path is controlled. As shown in FIG. 1, an air duct 15 has an opening 16 formed therein which, in this example can have a length of about 2 inches and a width in the direction of the paper which can be variable but, for example, can be about 1½ inches, which can be a typical outlet for an automobile air conditioning system, for example. A short curved parallel wall (which is about 1 inch in depth and can have a curvature of, for example, 1.620 radians through to about 2.58 radians, but which can, as will be shown later, be straight. The short straight wall 17 extends from the right side of opening 16. A second wall 18 forms a parallel flow path 19 and the exit outlet 20 of flow path 19. A control element 21 is movable between a blocking position at the inlet 22 of flow control passage 19 and an unblocked shown in dotted section. When the control element 21 is in a position to block the flow of air through parallel flow path 19, the main air stream 23 exit through opening 16 in a direction substantially coaxially or aligned with the axis of opening 16. Wall 17 is short and exerts substantially no deflection or control effects on the directional flow of air 23. When control element 21, which preferrably is planar so that it may move in a plane transverse to the axis of opening 16 is moved to unblock upstream end 22 then air enters the inlet end or upstream end 22 of parallel flow path 19 and exits through downstream opening 20. The effect of air flowing through passage 19 creates the condition which causes an immediate shifting of the direction of the main air from the direction 23 shown in FIG. 1 to the right as shown in FIG. 2. The effect is that since only a relatively small quantity of the main air stream is flowing along the path 19 and exiting through exit 20, produces a significant change in the direction of the main air flow 23. The effect is as if the length of the wall 17 were increased to an extent so as to achieve a wall attachment without the necessity of a physical structure of a wall of that extent. Therefore, the depth of the structure is significantly reduced. Typically, the length of the walls 17 can be about 1 inch or less.

In order to achieve control to the left or to the right, an identical structure is provided on the left side of the opening 16. Thus, as shown in FIGS. 3 and 4, a corresponding parallel flow path structure 30 is provided on the left side of opening 16'. The control element 21 can be a common plate which has a large opening 31 in the center thereof and which has side elements 21R and 21L for controlling the left and right parallel flow passages 19R and 19L. Thus, when the left segment 21L of control plate is blocking parallel flow path 19L so that there is no air exiting through the exit end 20L, the right control element 21R is not blocking the right control flow path 19R so that control air exits through downstream end 20L. This causes a deflection effect on the main air stream so that it exits and flows to the right as shown in FIG. 3. As shown in FIG. 4, the opposite effect happens when the right control element 21R blocks control passage 19R and the air is directed to the left. It will be appreciated that if the opening is rectangular, similar control flow passages can be provided to bound the lateral end of opening 16. (See the detailed embodiment shown in FIGS. 11-16).

In the embodiment shown in FIG. 5, in addition to control effect causes by the opening and closing of the control passage, an additional effect can be achieved by providing a short control flap as is shown in FIG. 5. In this case, in addition to the control passage 19 and control element 21, a pivotted flap, a greater sweep of air to the right can be affected. The walls bounding the parallel flow path need not be parallel. As shown, for example, in FIG. 6, the parallel paths 40R and 40L are box shaped for an air flowing into the control flow path as shown in FIGS. 6 and 7 air entering into the inlet end 40I creates a vortex in the corner so that the main stream flowing through the control passage or parallel flow path simply flows out to the outlet 40-0. The embodiment shown in FIG. 7 is a combination of the embodiment shown in FIGS. 5 and 6, and in this case, the control flap 50 is mounted adjacent the left short diverging wall 51L and is pivotted into the position shown in dotted lines by control arm 52. In order to accentuate some of the angle deflection, short louvers or veins may be provided. As shown in FIG. 8, these vanes 55 and 56 cause a deflection enhancement on the side that they are positioned on.

In FIG. 9, the terminus end TE of an air duct or tunnel T is provided with an controlled intruder plate 1P which slides in slots SW in the walls of air duct or tunnel T. In the position shown in FIG. 9, the controlled intruder plate has no portion intruding into the air flow path so there is no deflection of the air stream. In the position shown in dotted lines, the left portion of the controlled intruder plate has been positioned to project a very short distance into the flowing air stream at the terminus end TE to thereby deflect the main air stream to the right. Since it is only a very short intrusion, the added impedance to air flow is small but results in a significant deflection to the right. Similar effects in the opposite direction is achieved when the right intruder portion in the right side of the terminus end TE is impeded.

The detailed construction of an operating unit is shown in FIGS. 11-17 wherein a base member 60, which in the case is rectangular, fits inside the air conditioner duct work 61 at a terminus thereof. An opening 63 is formed in wall 64 of base member 60. Duct assembly 65 is comprised of four short flaring walls, that is, upper and lower short flaring walls 66 and 67 and side flaring walls 68 and 69, respectively, which are joined at their edges as at 70, 71, 72 and 73 to form a flaring duct assembly. The parallel flow path are formed by channel members 75, 76 and 77 and a short base element 78 with the inside ends 79 of side panel 75 being in generally sealingly secured relation to wall 66 and curved accordingly. A bottom wall member 78 projects inwardly a short distance from outer wall 76 and is spaced a short distance above the back wall 64 to form a space to accomodate the movement of a control plate 90. Member 78 can be eliminated without adversely affecting the performance of the device. The back wall 76 are secured to the inner walls of base member 60 and, obviously could be formed integrally therewith. Thus, the duct 65 and its adjacent parallel flow passageways which are designated 19 in FIG. 1 are stationary with respect to opening 63 is aligned with the center line of duct 65 and control plate 90 is moved in a plane so as to selectively block or unblock the entranceways or upstream ends of the parallel passages. In FIG. 12, these control flow entrances are designated E1 and E2 for the upper and lower parallel flow passages PF1 and PF2 of FIG. 11. In FIG. 13, control flow entrances are designated E3 and E4 for the parallel flow passages PF3 and PF4 of FIG. 11. It will be noted that in this embodiment that even when the control element is in a full blocking position as is illustrated in FIG. 12, the ends of walls 66, 67, 68 and 69 at the upstream ends thereof do not fully contact the plate. It has been found that the control works very well in the configuration illustrated in this embodiment. Any air flow past the space between the inner ends of the wall members 66, 67, 68 and 69 tend to create a slightly negative pressure in the chamber and hence does not affect the control. A layer of foam or other sealing material 95 is secured to the upstream surface of control plate 90 so as to provide a seal between the control plate and the surfaces of wall 64 so that air does not pass between those surfaces and upstream. It will be appreciated that sealing material 95 can be eliminated if desired without significantly altering the performance of the device. In other words, it is desired to avoid entrance of air into the control passages PF1, PF2, PF3 and PF4.

There can be many different mechanical ways of controlling the movement of control plate 90. For example, various forms of linkages and even simple gearing and pulley arrangements, and solenoid drives can be effected. The control plate 90 can be reciprocatingly driven by a motor and cam arranged to cause a sweeping movement of the air stream, and, if desired, such motors can be controlled by an on-board car computer or data processor to position plate 90 and hence the air stream at any predetermined position of deflection desired.

However, in this embodiment, control plate 90 is coupled by short bars 96, 97, 98 and 99 to a control frame 100. Control frame 100 has inwardly projecting short arms 101, 102, 103 and 104 to which the short rods 96, 97, 98 and 99 are secured, respectively. Frame 100 has the back surface thereof flush with the wall 62 of air duct 61 and thus moves parallel to the surface thereof. While the friction between the foam element 95 secured to control plate 90 and the inner surface of wall 64 would be sufficient to maintain the control plate in a selected position, various other forms of maintaining the control plate in a selected position can be utilized as for example, detents and the like. In this embodiment, a rod 110 is secured to a pair of upstanding members 111 and 112, respectively. A second similar rod 113 is secured by securement means 114 and 115 to the outer edges of members 66 and 67, respectively. Rod 110 and rod 113 pass through friction members 117 and 118, respectively which are secured to each other at their centers. Thus, the movement of controled frame 110 in any direction is maintained in the position to which it has been moved by the friction between rods 110 and 113 in sliding friction blocks 117 and 118, respectively.

As shown in FIG. 16, control element 90 essentially has an opening in it which is approximately, but not necessarily, of the same cross section as the opening in the duct formed by short wall member 66, 67, 68 and 69 so that when the control plate 90 is in a central position, air flows from the duct 61 in a substantially unimpeded fashion through the duct 65 and thence diffuses itself into the ambient space, which in an automobile will be the interior compartment. It will be appreciated that because of the short depth of the unit which, in the exemplary embodiment disclosed in FIGS. 11-16 is substantially to scale and is an operating prototype as disclosed in these figures, is admirably suited and is particularly designed for use in an automobile. Where large deflection angles are desired in relatively short space without significantly reducing or lowering the operating efficiency of the duct. While in the embodiment illustrated in FIGS. 11-16 has a number of component parts which are indicated as separate, it will be appreciated that many component parts can be combined and integrally formed either through injection molding techniques or vacuum molding of component plastic parts. In FIG. 16, the opening 63 in base 64 is shown as bounded by the dash lines 120.

While there has been shown and described preferred embodiments of the invention, it will be appreciated that other embodiments, obvious to those skilled in the art, can be produced without departing from the spirit and scope of the invention as is defined in the claims appended hereto.

What is claimed is:

1. An air distribution controller comprising means forming an opening from a source of air under pressure for issuing air to ambient atmosphere with a main air flow vector,
    a short wall connected to said opening and diverging from said opening and extending in a direction away from said opening,
    means adjacent said short wall defining a parallel flow path for a relatively smaller volume of air from said source of air under pressure to an exit point downstream of and adjacent the end of and substantially parallel to said short wall,
    means controlling the flow of said relatively small volume of air in said parallel flow path and the main air flow vector of air through said opening whereby said main air flow vector is substantially coaxial with said opening when said parallel flow path is closed and is deflected in the direction of said short wall when said parallel flow path is open.

2. The air distribution controller defined in claim 1 including a movable intruder member positioned for intruding in the air flow on the opposite side of said opening from said parallel flow path and upstream of the downstream end of said short wall, and means for coupling said intruder member to said means controlling the flow of air in said parallel flow path so that as said intruder member is caused to intrude into said opening, said parallel flow path is opened a corresponding amount.

3. The air distribution controller as defined in claim 1 wherein said short wall is curved.

4. The air distribution controller as defined in claim 1 wherein said short wall is planar.

5. The air distribution controller as defined in claim 1 including at least one further short wall adjacent said opening and at least one further parallel control path delivering air towards the end of said short wall and in a direction substantially parallel thereto and means for controlling the flow of air in said at least one further parallel flow path.

6. The air distribution controller defined in claim 5 including a controlled intruder plate member positioned for intruding in the air flow at the upstream end of each said short wall, respectively at said opening opposite each said parallel flow path an amount substantially corresponding to the opening of each said parallel flow path by said means controlling the flow of air in said parallel flow path.

7. The invention defined in claim 5 including a flap member and means for positioning said flap member in said opening to direct air in said selected direction.

8. The air distribution system defined in claim 5 including a fixed vane spaced from said short wall and inclined in a direction substantially parallel thereto.

9. The air distribution system as defined in claim 2 wherein said intruder means is a flat plate operated in a plane orthogonal to air flow through said opening.

10. In an automobile air distribution system having means for generating a flow of air under pressure for distribution into the passenger compartment of an automobile, an air distribution outlet comprising in combination.

means forming an opening for air exiting into the passenger compartment of the automobile.

a short diverging wall adjacent said opening, means forming a parallel flow path adjacent said opening for directing a stream of air extending in a direction substantially parallel with and in the downstream direction of said short wall and means for controlling the flow of air into said parallel flow path so as to cause a deflection of the air stream in said passenger compartment to a selected position therein.

11. The invention defined in claim 10 including intruder means commonly operated with said means for controlling intruding into said opening positioned for intruding in the air flow on the opposite side of said opening from said parallel flow path.

12. In an automobile air distribution system having means for generating flow of air under pressure for distribution into the passenger compartment of an automobile and an air distribution outlet the improvement comprising in combination, said air distribution outlet including means forming an opening for air exiting into the passenger compartment of the automobile along a predetermined air flow vector, a plurality of short diverging walls, each short diverging wall being adjoined to a pair of adjacent diverging sidewalls, said sidewalls completely circumferentially bounding said outlet, and connected to and extending in a diverging downstream direction from said opening, said diverging walls also completely bounding said opening, an intruder plate member manually positionable from a position downstream of said opening for controlling the intrusion of said intruder means into said opening on an opposite side of said opening from one of said short walls to direct the air flow in the diverging direction of said one of said short diverging walls whereby the direction of air flow through said outlet is controlled from 0 to 360 degrees, and further means for retaining said plate member in a selected position.

13. In an air distribution system having a supply of air under pressure leading through a duct to an outlet for issuing a jet of air to ambient and means at said outlet for causing deflection of said jet of air in a plurality of selected directions, the improvement comprising, a plurality of short diverging walls, each diverging wall being adjoined to a pair of adjacent diverging sidewalls, said sidewalls completely circumferentially bounding said outlet, a plate member having an opening therein, said opening having edges corresponding in number to the number of said short sidewalls and a control means connected to said plate member for moving said plate member in its own plane to cause a selected one of said edges to intrude a short distance into said outlet to cause a deflection of the jet of air in the opposite direction whereby said air distribution system can direct air through said outlet in any one selected direction from 0 to 360 degrees, and means for retaining said plate member in a selected position.

14. The air distribution system defined in claim 13 wherein said means for retaining said plate member in a selected position includes a pair of friction sliding elements.

* * * * *